May 26, 1959     R. S. BETTES, JR     2,887,724

MAKING SPHEROIDAL PARTICLES

Filed Dec. 3, 1956     2 Sheets-Sheet 1

INVENTOR.
Richard Stockwell Bettes, Jr.

BY *Michael D. Defney*

ATTORNEY

May 26, 1959  R. S. BETTES, JR  2,887,724
MAKING SPHEROIDAL PARTICLES
Filed Dec. 3, 1956  2 Sheets-Sheet 2

INVENTOR.
Richard Stockwell Bettes, Jr.
BY
ATTORNEY

United States Patent Office 2,887,724
Patented May 26, 1959

2,887,724

MAKING SPHEROIDAL PARTICLES

Richard Stockwell Bettes, Jr., Park Forest, Ill., assignor to Standard Oil Company, Chicago, Ill., a corporation of Indiana Application December 3, 1956, Serial No. 625,851

7 Claims. (Cl. 18—47.2)

This invention relates to spheroidal particles. More particularly the invention relates to the making of particulate spheroids from wax-like materials.

In the processing of paraffin wax, beeswax, Carnauba wax and other wax-like materials it is very helpful to have the wax in a granular or otherwise finely divided form. It is rather difficult to granulate wax-like materials because the granulating action itself tends to cause stickiness due to heat generation during the process. Also these wax materials are not friable and do not break up readily. Many attempts have been made in the past to produce spheroidal particles from wax-like materials but these attempts have not been successful; mainly it has been extremely difficult to obtain particles of substantially uniform size.

A demand has arisen for the so-called plastic resins in very finely divided form. It is preferred to have spheroidal materials because these materials are free-flowing and thereby simplify the handling problem in storage and also are more readily plasticized. The plastic materials have melting points or solid points close to room atmospheric temperatures are difficult to produce in spheroidal form because the tendency of the particles to agglomerate and to form irregularly shaped aggregates.

An object of the invention is a process for making spheroidal particles. Another object is a process for making spheroidal particles of materials which are solid at ordinary atmospheric temperature but of comparatively low melting points. A further object is a process for making spheroidal particles of wax-like materials. A particular object is a process for making particulate paraffin wax spheroids which are free-flowing at ordinary atmospheric temperatures. A further particular object is a process for making spheroidal particles of substantially uniform size. Other objects will become apparent in the course of the detailed description.

The process of the invention comprises forming droplets of molten material, which is to be formed into spheroidal particles, in an upper portion of a vertical vessel. The droplets fall by gravity action in the vertical vessel against a rising stream of air. The air-stream is at a temperature below the solidification point of the material forming the droplets and during the fall the droplets become sufficiently solid i.e., form a skin of solid material of appreciable thickness sufficient to prevent deformation of the spheroid. After a fall over a height under conditions to form the solid skin, the spheroidal particles drop into a turbulent bed of spheroidal particles. This bed of spheroidal particles is in violent motion due to the flow of the air-stream through the bed. The turbulence of the bed of solid particles in the air-stream gives the picture of a fluid and therefore this bed is called hereafter a fluid bed of particles. The fluid bed is formed and maintained by flow of the air-stream through an air-distributor grid. The air-distributor grid is positioned in a lower portion of the vertical vessel and is on a horizontal plane, i.e., the grid is perpendicular to the height of the vessel. The air-distributor grid is provided with apertures of a size such that essentially all the spheroidal particles are retained above the grid. The spheroidal particles are retained in the fluid bed for a time at least sufficient to cool the particles to a temperature at which the particles are substantially solid and also substantially free-flowing and there is no tendency to agglomerate by cohesion of the surfaces. The product spheroidal particles are removed from the vessel by way of conduit means which communicate with said bed.

The invention is described in detail in connection with the annexed figures which form part of this specification. Other modifications can be readily devised and the claimed invention is not limited to the precise embodiment shown in the figures.

Figures 1, 2, 3:
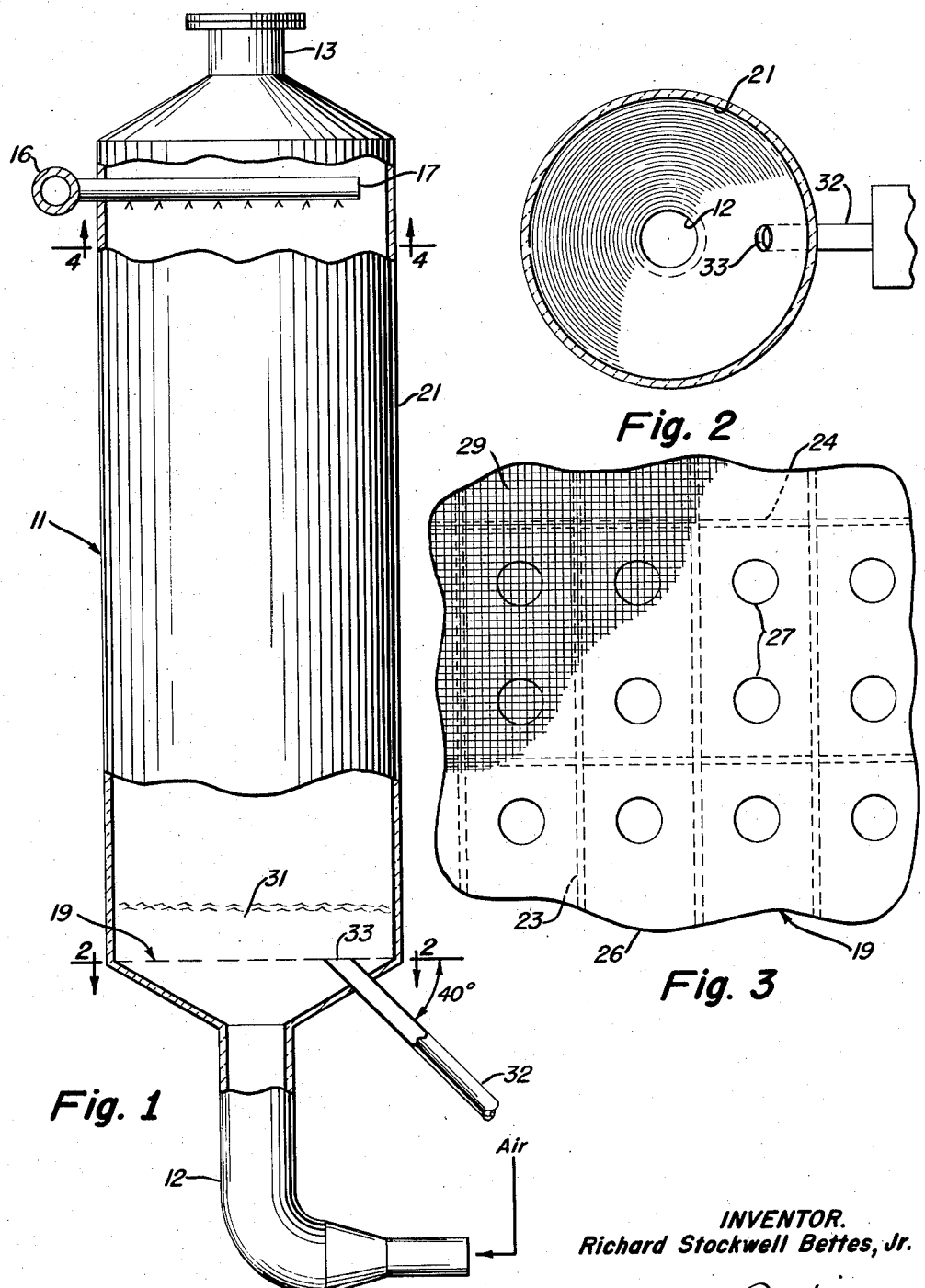
Figure 1 shows one embodiment of a vessel adapted to produce particulate wax spheroids.
Figure 2 is a cross-sectional view across the vessel of Figure 1 along the line 2—2.
Figure 3 shows a partial view of an air-distributor grid utilized in the vessel of Figure 1.
Figure 4:
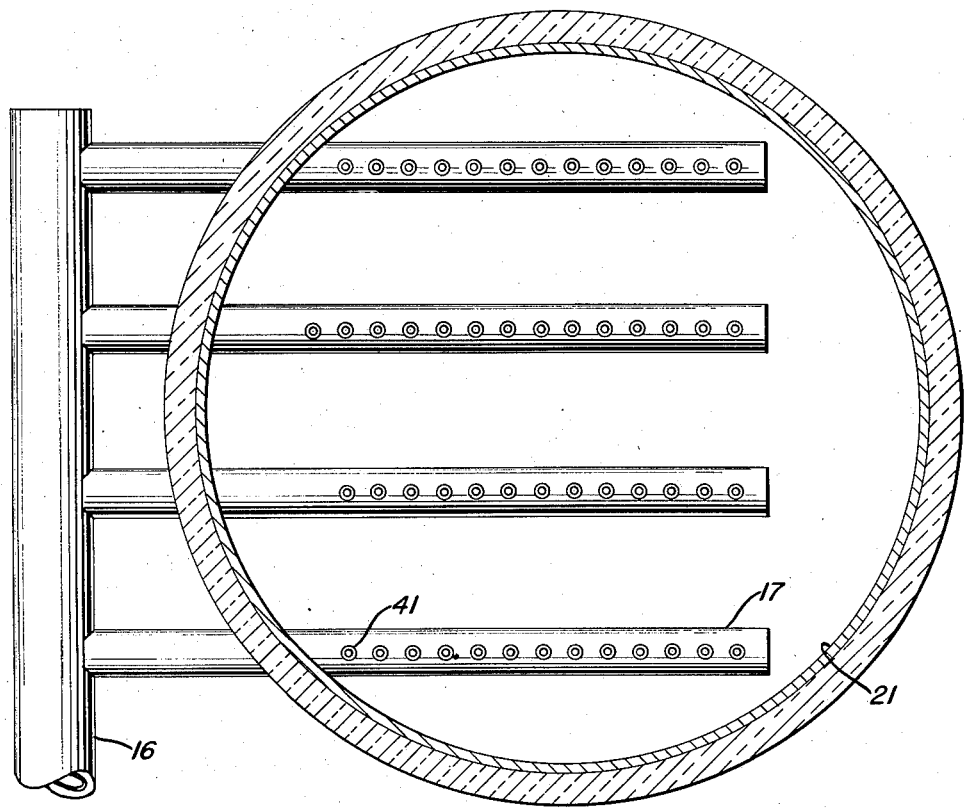
Figure 4 shows a cross-sectional view looking upwards along the line 4—4 of the vessel of Figure 1.
Figure 5:
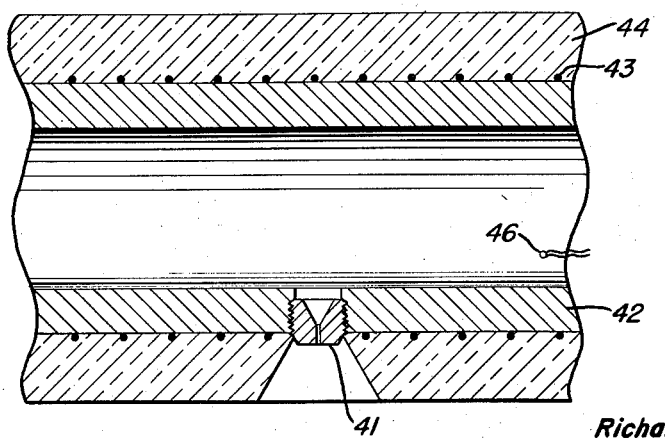
Figure 5 shows a partial cross-sectional view of a portion of the wax distributor-means and a nozzle.

Figure 1 shows one form of a vertical vessel 11 adapted for the production of spheroidal particles according to the process of the invention. Vessel 11 is a vertical cylindrical structure provided with a lower conduit 12 for the entry of air or other gaseous cooling means and a conduit 13 for the exit of the gaseous cooling means. The air-stream introduced by way of conduit 12 is at a temperature below the solidification point or melting point of the material to be formed into spheroids. The air may be at atmospheric temperature or it may be refrigerated or even in some cases heated to the desired operating temperature. Even when handling a particular material all year around at different seasons of the year the air introduced into vessel 11 may have to be heated in one season and refrigerated in another season.

The material which is to be formed into solid spheroids is, of course, solid at ordinary atmospheric temperatures. Ordinary atmospheric temperatures are understood herein to include the range of temperatures of about −20° F. to +130° F. Since the spheroidal particles generally are intended to be used over many portions of the earth's surface normally the spheroidal material will have a melting point or solid point in excess of 100° F. The process is particularly applicable to any material which has a melting point or softening point or solid point in excess of about 100° F. and not too far above atmospheric temperatures. In general the process is preferred to be operated on waxes and wax-like materials which have softening points on the order of 100° F. to 180° F. Examples of these wax-like materials are paraffin waxes, microcrystalline paraffin waxes, beeswax, the various vegetable waxes such as Carnauba wax and mineral waxes. Also the invention is applicable to the thermoplastic resins which have melting points below the decomposition temperatures. Examples of these materials are cellulose esters, polyvinyl chloride, polyvinyl acetate, polystyrene, polyethylene, etc. The invention is not limited to these materials but may also be used in the formation of spheroids of metals particularly the lower melting metals such as, sodium, potassium, and lithium. It is to be understood that the material charged to the process must be capable of being suspended essentially in a stream of air or gaseous material and therefore materials of very high density may be operable only under special conditions of pressure and gas velocity in vessel 11.

The material which is to be formed into spheroidal solid particles is introduced in the molten state into an upper portion of vessel 11 and is formed into droplets. In Figure 1 liquid to be formed into spheroidal particles is charged by way of conduit 16 into distributor line 17. In the embodiment a paraffin wax having a melting range 122–127° F. is charged into distributor by way of conduit 16. The droplets are formed by action of the nozzles 10 in a distributor means by break up during the fall against the ascending air-stream. When it is desired to produce particles of substantially uniform size it is preferred to have the distributor-means determine the size of droplets rather than rely on break up in the ascending air-stream. Sufficient height must be provided in vessel 11 to permit the air-stream to cool the surface of the falling droplets and to form a skin thereon. This skin of solid material should be substantially thick to avoid deformation during the residence time of the particle in the fluid bed wherein the final cooling or solidification takes place. The height of the vessel will be determined by the material charged, the temperature of the air-stream and the velocity of the air-stream. In the particular embodiment described the wax is charged to the distributor-means at a temperature of 140° F.; the air-stream at the bottom of the vessel just below grid 19 is about 3 linear feet per second and the air temperature at this point is 65° F. The wax charged to the tower amounts to 40 pounds per minute. The diameter of vessel 11 at the grid is 10 feet. At these conditions a tower height of 30 feet produces sufficient solidification to avoid substantially all deformation when the wax particles reach the fluid bed supported on grid 19.

Positioned in the lower portion of vessel 11 is an air-distributor grid 19. A portion of the particular air-distributor grid utilized in the wax spheroidal embodiment herein is shown in Figure 3. Air-distributor grid 19 covers essentially the entire cross-sectional area of the cylindrical portion 21 of vessel 11. It is to be understood that a supporting means at the periphery of the grid will reduce the cross-sectional area actually controlled by the grid. Fundamentally the air-distributor grid is a device for spreading out the air-stream from conduit 12 substantially uniformly over the cross-sectional area of portion 21 of vessel 11. Also the grid is constructed so as to retain the wax particles within portion 21 of vessel 11. In Figure 3 there is depicted a grid utilized in a large scale embodiment. Grid 19 comprises a number of metal I-beams 23, etc. and 24 etc. These I-beams are interacted to form an egg crate type of structure. The purpose of the structure formed by the I-beams is a supporting member for the apertured portion of the grid. Supported on the egg crate structure is a plate 26 which is provided with a plurality of circular apertures. The apertures 27, etc. in this particular embodiment are one-half inch in diameter and are set on 1.5 inch centers. Above the apertured plate 26 there is positioned a wire mesh screen 29 which retains the wax particles above grid 19. It is obvious that in such an operation some wax particles will be of a size to pass through even screen 29 but in general screen 29 is sized to retain wax particles of the smallest size expected to reach the grid. In this particular embodiment screen 29 is made of 60 mesh screening. In this particular construction apertured plate 26 and screen 29 take about 20% of the pressure drop through vessel 11.

It is to be understood that the detailed construction set out above is not limiting and that the grid construction will be determined by the requirements of the particular material being processed and by the size of vessel 11. In some cases a screen of the proper mesh size or a support therefore may be sufficient. In other instances where larger spheroidal particles are to be made as for example, particles having a size in excess of 0.1″ plate 19 may be apertured in such a way that no screen is needed.

It is necessary to remove the particle product from vessel 11 and this is done by means of a conduit which communicates with the fluid bed 31 existing above grid 19. In this embodiment a single conduit 32 is passed through the shell of vessel 11 below the grid and terminates at the surface of the screen 29; opening in screen 29 being provided at this point. When operating with wax and wax-like materials it is generally desirable that conduit 32 be inclined at about an angle of 40° or more from the horizontal in order to permit essentially gravity flow of the wax particles from the bed through the conduit 32 to wax storage not shown. Figure 2 which is a view at line 2—2 of Figure 1 shows the vessel 11 below the grid. In this view the opening 33 terminates conduit 32 at the grid screen 29 level as shown.

Only one conduit is shown in this embodiment but more than one of these may be used. The liquid-like character of the bed 31 above grid 19 permits the entry point 33 to be positioned substantially anywhere on the cross-sectional area of portion 21 of vessel 11. In the case of short residence times and large diameter vessel it may be desirable to use two or even three conduits. Fluid bed 31 has a substantial height above grid 19 so that it is not necessary that entry point 33 be flush with the top of grid 19. Under some conditions it may be desirable to have the conduit means extend above the grid a distance into the fluid bed 31 itself. Such an arrangement is particularly desirable when the character of the material being formed makes it difficult to obtain a fluid bed in the absence of any particles on the grid 19 at the time that air is first introduced into the vessel.

The distance between distributor-means 17 and the top of the fluid bed 31 is preferably made just sufficient to permit the formation of a skin of solid material on the falling droplet. The skin formed is sufficient to prevent deformation in the turbulent action of the fluid bed 31 and also cohesion of particles. Heights above this minimum are wasteful since the main cooling is carried out at the fluid bed. However, longer falls at fixed conditions do decrease the residence time of the particles in the fluid bed. It is preferred to utilize the minimum vessel height for a particular liquid at particular conditions in order to obtain the greatest economy of construction. The fluid bed can be varied in order to take up variations in feed quality.

Fluid bed 31 consists of a suspension of particles in the air-stream exiting through air-distributor 19. The velocity of the air-stream above distributor 19 is enough to support the wax particles for an appreciable distance, predetermined, above the top of grid 19. The velocity is such that when the air-stream assumes its linear velocity determined by the cross-sectional area of cylindrical portion 21 of vessel 11 there is no significant entrainment of wax particles above the fluid bed. The fluid bed has the appearance of an agitated liquid pool and indeed seen in profile has the appearance of agitated water in a glass container, that is, a sharp break is evident between the fluid bed and the atmosphere above the bed. Furthermore, the wax particles in the bed flow from one elevation to a lower elevation just like a liquid. Because this suspension of particles behaves much like a true liquid it is described herein as a fluid bed of particles. It is this fluidity that permits flow of the wax particles from bed 31, through conduit 32 permitting product to be removed from vessel 11.

The air-stream from conduit 12 must have sufficient velocity to form a fluid bed of particles above grid 19 but not such a great free linear velocity in portion 21 of vessel 11 such that uneconomic entrainment results by way of the exit stream through conduit 13. The particular velocity of the air-stream will be determined by material being processed, the characteristics of the particular grid and the method of formation of droplets. When operating with wax-like materials and particularly the paraffin waxes the flow rate of the air-stream from conduit 12, measured immediately below grid 19, is generally between about 1 and 5 linear feet per second. It is preferred to maintain conditions such that the linear velocity of the air-stream measured immediately below the grid is between about 1 and 3 feet per second.

The air-stream entering vessel 11 must be below the solid point or melting point of the material being processed. The temperature of the air-stream is also determined by the requirement for the formation of a substantial skin of solid material during the fall from the distributor means into the fluid bed. With regard to the skin which must be formed it is to be understood that this is a relative term. Materials which are not tacky can usually be operated so as to have only a thin skin. Tacky materials may require appreciable surface cooling in order to reduce the tackiness to a bearable degree. When operating with wax materials in general the air-stream reaches the grid 19 at a temperature between about 50° F. and about 80° F. When operating with the higher melting point or softening point waxes the upper temperature may be higher. Lower temperatures may be used but have a tendency to change the surface characteristics of the wax and reduce agglomerating tendencies to such an extent that it is difficult to form molded objects from the wax particles, in general it is preferred to operate at a temperature between about 55° F. and 70° F. when using paraffin wax having a melting point between about 110° F. and 140° F.

The wax particles which fall into the fluid bed are retained in the bed for a time sufficient to solidify the particles completely or just long enough to cool the particles to the point where they act like solids. In order to be able to withdraw the particles from the vessel it is necessary that the cooled particles be free-flowing therefore the cooling must be sufficient to overcome any tackiness of the surface of the particles and permit the particles to flow freely for example, like dry sand. The extent of cooling will be determined by the particular material which is being processed. In the case of paraffin waxes it appears that the wax particles should be retained in the fluid bed until they have reached the average bed temperature which average bed temperature is desirably between about 5° F. and 10° F. above the temperature of the entering air-stream. For example, with air at 75° F. and a wax having a melting point between about 122°–127° F. the bed temperature should be about 80° F. to obtain a product which is free-flowing and substantially solid.

The turbulent nature of the fluid bed permits very rapid heat transfer. In the particular embodiment shown here using paraffin wax under the defined conditions of operation a fluid bed having a static height of about 2 inches is equivalent to about 30 feet of tower height in cooling effectiveness. This means that the height of the cylindrical portion 21 of vessel 11 is about one-half of what it would have to be if a single drop shotting operation were used. Static height of bed is defined herein as the height of particles on the bed with no air passing through the distributor. When air is passing through the distributor the bed is expanded to a height determined by the velocity of the air through the grid and the characteristics of the particles namely, density and size. In the particular embodiment described the expanded height would be in the neighborhood of 5 inches for a static height of 3 inches.

With wax materials operating at the preferred air temperature and air velocity in general the wax particles are retained in the fluid bed for a period from about 5 minutes to 15 minutes. n the particular illustrative example utilizing vessel 11 and other conditions set out previously wax particles are retained only for a period of about 10 minutes. The residence time of the particles on the grid is determinative rather than the thickness of the bed. If sufficient residence time is provided, product can be made even though apparently there are not sufficient particles on the grid to superficially define a bed. Retention times in excess of the minimum are not harmful. Fluid beds having static heights several times that needed to provide the minimum retention time may be utilized if air-distributor 19 and other equipment needs have been properly considered. The vessel 11 may be utilized as an emergency storage container or even as a regular surge drum in order to permit continuous operation of the vessel 11 even though equipment farther down stream using the wax product may have been forced down for some unexpected or even scheduled reason. Furthermore, the existence of a higher than needed bed in vessel 11 will permit repairs to the distributor means, one or more elements thereof, or even a short shutdown of the entire distributor without forcing a shutdown of the operation beyond the spheroid production operation.

In Figures 4 and 5 there are set out a particular form of distributor spray means utilized in formation of particulate wax spheroids. In Figure 4 molten wax is passed through manifold conduit 16 into individual distributors 17, etc. Each of the distributors 17, etc. is provided with a number of nozzles 41. Nozzles 41, etc. are set out on distributor 17, etc. in such a way that substantially all the cross-section of portion 21 of vessel 11 is covered by the wax spraying from the nozzle. In Figure 5 a cross-section of a portion of distributor 17 including nozzle 41 is shown. Conduit 42 is wrapped with electrical heating means 43 and is then insulated with insulation coating 44. A thermocouple 46 is shown which permits following the temperature of the wax charged to the distributors. A nozzle 41 is threaded into an opening in conduit 42, insulation 44 is cut back so as to avoid build up of wax around the nozzle 41.

The pressure exerted within the distributors and the nozzle construction determine the particular size distribution, along with the air-stream, of the product particles. In the production of wax cakes by compressing wax particles in a mold it is desired to have the wax particles of very uniform size. In this particular embodiment distributors 17, etc. are operated at a pressure between about 5 and 25 pounds per square inch gauge. The tip opening of nozzles 41, etc. is on the order of 0.02 inch. Under these conditions of the nozzle opening pressure paraffin wax having a melting point of between 110° F. and 140° F. is transformed into wax spheroids having a particle size which passes through a 0.046 inch screen and are retained to the extent of 90% or more on a screen having a size of 0.023 inch.

In the following table there is set out product wax distribution corresponding to different nozzle pressures:

TABLE

*Sieve analysis of spheroidal paraffin wax*

| | Percent by Wt. Retained on Screen | | |
|---|---|---|---|
| | 10 | 20 | 30 |
| Screen Size, in.: p.s.i.g. Nozzle Pressure | | | |
| 0.046 | 0.44 | 0.00 | 0.25 |
| 0.033 | | | 8.23 |
| 0.023 | 99.10 | 99.50 | 89.33 |
| 0.016 | 0.42 | 0.25 | 1.72 |
| 0.011 | 0.02 | 0.14 | 0.29 |
| Pan | 0.02 | 0.13 | 0.18 |

The product wax of the above particle sizes has an apparent density of only one-half that of regular type. This corresponds to the apparent density of about 0.25 which is obtained for granulated wax obtained by commercial process. The higher apparent density is very desirable in molding operations because it decreases the size of the mold for a given final product density and the amount of work required to press the particles into the final size.

Numerous samples of wax spheroids produced by the process described on a pilot plant scale show that no objectionable odors are formed in the wax during the spheroid formation operation; also the wax spheroids have excellent storage stability both with respect to odor formation and agglomeration of the particles.

Thus having described the invention what is claimed is:

1. A process for making substantially spheroidal solid particles of material which is solid at ordinary atmospheric temperatures, which process comprises forming droplets of molten material in an upper portion of a vertical vessel, passing by gravity action said droplets downward against a rising stream of air, said air-stream being at a temperature below the solidification temperature of said material, thereby forming substantially solid spheroidal particles of said material, collecting said descending droplets in a turbulent fluid-like bed of particles, which bed is maintained above and in contact with an air-distributor grid which grid is positioned in a horizontal plane in a lower portion of said vessel over essentially the cross-sectional area thereof, said grid being provided with apertures able to retain particles of the smallest size expected to reach the grid, said bed being maintained above said grid by flow of said air-stream therethrough, retaining said particles in said bed for a time at least sufficient to cool said particles to a temperature at which said particles are substantially solid and substantially free-flowing, and removing said solid spheroidal particles from said vessel by way of conduit-means communicating with said bed.

2. A process for making substantially spheroidal particles of wax-like solids, which process comprises forming liquid drops of said wax-like solid in an upper portion of a vertical vessel, cooling said drops by descent against a rising stream of air to form a solid surface on said drops, said air-stream being at a temperature below the melting point of said wax-like solid, collecting said cooled drops in a fluid bed of cooled and solid drops maintained in a lower portion of said vessel, said bed being in contact with the upper side of an air-distributor grid, said grid being positioned in a horizontal plane over essentially the cross-sectional area of said vessel, said grid being provided with apertures able to retain solid particles of the smallest size expected to reach said grid, said fluid bed being maintained by flow of said air-stream through the apertures in said grid, holding said cooled particles within said fluid bed until these are substantially solid and withdrawing by free-flow said substantially solid particles from said vessel by way of conduit-means communicating with said bed.

3. A process for making substantially spheroidal paraffin wax particles which process comprises introducing molten wax into an upper portion of a vertical vessel through a distributor means to form a descending molten wax spray, passing an air-stream upwardly through said vessel against said wax spray, said air-stream being at a temperature substantially below the melting point of said wax, thereby forming substantially spheroidal particles having a skin of essentially solid wax, collecting said falling spheroidal wax particles in a fluid bed maintained above an air-distributor grid positioned in a horizontal plane over essentially the cross-sectional area of a lower portion of said vessel, said grid being provided with apertures to retain essentially all the wax particles reaching the grid, maintaining said fluid bed and obtaining said particle formation by passing the air-stream through said apertures at a flow rate below the grid of between about 1 and 5 linear feet per second, holding said wax particles within said fluid bed for a time sufficient to obtain substantial solidification thereof and to cool to a temperature such that the cooled particles are substantially free-flowing, and withdrawing substantially spheroidal wax particles from said vessel by free-flow through conduit-means communicating with said bed.

4. The process of claim 3 wherein said air-stream temperature below said grid is between about 50° F. and 80° F.

5. The process of claim 3 wherein the fluid bed temperature is between about 5° F. and 10° F. higher than the temperature of the air-stream below the grid.

6. A process for making particulate paraffin wax spheroids which process comprises introducing molten paraffin wax, having a melting point between about 110° F. and 140° F., into a distributor-spray means positioned in an upper part of a vertical vessel, said spray means being provided with nozzles having a spray opening on the order of 0.02 inch, said molten wax reaching said nozzles at a pressure of between about 5 and 25 p.s.i.g., thereby affording molten wax jetting downward in said vessel, introducing air into a lower portion of said vessel at a temperature between about 55° F. and 70° F. and at a linear velocity, in said vessel, of between about 1 and 3 feet per second, passing said air-stream through an air-distributor grid positioned in a horizontal plane over the cross-sectional area of said vessel above the point of air entry, said grid being provided with apertures adapted to retain wax particles of the smallest size expected to reach said grid, falling the wax jets against the ascending air-stream for a height sufficient to produce wax spheroids having a skin of solid wax, collecting said wax spheroids in a fluid bed of wax spheroids maintained immediately above said grid, retaining said wax spheroids in said bed for a time sufficient to obtain substantial solidification and to reach a temperature of between about 5° F. and 10° F. above the temperature of said entering air-stream, and withdrawing substantially solid particulate wax spheroids from said vessel by free-flow by way of conduit-means communicating with said bed, said product wax spheroids being characterized by a particle size such that at least about 90% are retained on a screen having a size of 0.023 inch and substantially none retained on a screen having a size of 0.046 inch.

7. The process of claim 6 wherein said retention time in said bed is between about 5 and 15 minutes.

References Cited in the file of this patent

UNITED STATES PATENTS 2,714,224    Schaub _____ Aug. 2, 1955